US012614255B2

(12) United States Patent
Garcia-Ortiz et al.

(10) Patent No.: US 12,614,255 B2
(45) Date of Patent: Apr. 28, 2026

(54) SPATIAL SPARSITY EXPLOITATION IN NEURAL NETWORK PROCESSING

(71) Applicant: Snap Inc., Santa Monica, CA (US)

(72) Inventors: Alberto Garcia-Ortiz, Bremen (DE); Orlando Miguel Pires dos Reis Moreira, Eindhoven (NL); Luc Johannes Wilhelmus Waeijen, Haelen (NL); Zeqi Zhu, Eindhoven (NL)

(73) Assignee: Snap Inc., Santa Monica, CA (US)

( * ) Notice: Subject to any disclaimer, the term of this patent is extended or adjusted under 35 U.S.C. 154(b) by 289 days.

(21) Appl. No.: 18/421,369

(22) Filed: Jan. 24, 2024

(65) Prior Publication Data

US 2025/0238903 A1 Jul. 24, 2025

(51) Int. Cl.
*G06T 5/60* (2024.01)
*G06T 19/00* (2011.01)

(52) U.S. Cl.
CPC .............. *G06T 5/60* (2024.01); *G06T 19/006* (2013.01); *G06T 2207/20084* (2013.01)

(58) Field of Classification Search
CPC ..................... G06T 5/60; G06T 19/006; G06T 2207/20084; G06T 2207/20081; G06N 3/0495; G06N 3/063; G06N 3/0464; G06N 3/045; G06N 3/04; G06N 3/08; G06N 3/09; G06N 3/084; G06N 3/048; G06N 3/082; G06N 3/0455; G06N 3/047; G06V 10/82; G06V 10/454; G06V 10/7715; G06V 10/764; G06V 10/462;

G06V 10/25; G06V 10/771; G06V 10/44; G06F 17/15; G06F 17/16; G06F 17/18; G06F 18/213; G06F 7/5443; H04N 19/124; H04N 19/59
See application file for complete search history.

(56) References Cited

U.S. PATENT DOCUMENTS

| | | | | |
|---|---|---|---|---|
| 10,311,321 | B1 * | 6/2019 | Kim | G06N 3/084 |
| 11,244,191 | B2 * | 2/2022 | Yao | G06N 3/082 |

(Continued)

OTHER PUBLICATIONS

"Loihi—Intel", WikiChip, [Online] Retrieved from the Internet: <URL: https://en.wikichip.org/wiki/intel/loihi>, (Oct. 1, 2021), 14 pgs.

(Continued)

*Primary Examiner* — Michael S Osinski
(74) *Attorney, Agent, or Firm* — Schwegman Lundberg & Woessner, P.A.

(57) ABSTRACT

Examples described herein relate to neural network processing. Each of a plurality of input feature maps may be processed to obtain respective output feature maps. For each input feature map, a differential feature map is obtained based on differences between corresponding values of a first set of values of the input feature map in respective spatially adjacent segments thereof. A transformation operation is performed on at least a subset of a second set of values of the differential feature map to generate a transformed differential feature map that includes a third set of values. An output feature map is generated and includes a fourth set of values. At least a subset of the fourth set of values is obtained by accumulating respective values of the third set of values with corresponding values of the fourth set of values that were previously generated in the output feature map.

20 Claims, 4 Drawing Sheets

(56) References Cited

U.S. PATENT DOCUMENTS

| | | | | |
|---|---|---|---|---|
| 11,704,536 | B1* | 7/2023 | Wu | G06N 3/045 706/31 |
| 12,340,313 | B2* | 6/2025 | Yan | G06N 3/09 |
| 12,412,070 | B2* | 9/2025 | Min | G06N 3/045 |
| 12,423,774 | B2* | 9/2025 | Xuan | G06V 10/764 |
| 12,468,932 | B2* | 11/2025 | Xue | G06N 20/00 |
| 2013/0325759 | A1* | 12/2013 | Rachevsky | G06V 10/764 706/12 |
| 2015/0055824 | A1* | 2/2015 | Hong | G06V 10/255 382/103 |
| 2016/0358069 | A1* | 12/2016 | Brothers | G06F 7/764 |
| 2017/0097884 | A1* | 4/2017 | Werner | G06F 15/76 |
| 2017/0221176 | A1* | 8/2017 | Munteanu | G06F 18/24137 |
| 2017/0323196 | A1* | 11/2017 | Gibson | G06N 3/09 |
| 2018/0032857 | A1* | 2/2018 | Lele | G06N 3/063 |
| 2018/0046906 | A1* | 2/2018 | Dally | G06N 3/0464 |
| 2018/0089562 | A1* | 3/2018 | Jin | G06N 3/08 |
| 2018/0096226 | A1* | 4/2018 | Aliabadi | G06N 3/045 |
| 2019/0156144 | A1* | 5/2019 | Li | G06F 18/2148 |
| 2019/0164037 | A1* | 5/2019 | Kim | G06N 3/0464 |
| 2019/0251203 | A1* | 8/2019 | Kondo | G06F 17/16 |
| 2020/0065646 | A1* | 2/2020 | Mahmoud | G06N 3/04 |
| 2020/0118249 | A1* | 4/2020 | Kim | G06N 3/0464 |
| 2020/0218929 | A1* | 7/2020 | Li | G06V 20/10 |
| 2020/0296387 | A1* | 9/2020 | Mao | H04N 19/159 |
| 2020/0342294 | A1* | 10/2020 | Jang | G06N 3/0464 |
| 2021/0034695 | A1* | 2/2021 | Suzuki | G06F 17/16 |
| 2021/0142144 | A1* | 5/2021 | Han | G06N 3/045 |
| 2021/0192687 | A1* | 6/2021 | Liu | G06T 3/4046 |
| 2021/0295138 | A1* | 9/2021 | Symes | G06N 3/0464 |
| 2021/0366080 | A1* | 11/2021 | Jung | G06N 3/045 |
| 2022/0012587 | A1* | 1/2022 | Kong | G06V 10/94 |
| 2022/0028139 | A1* | 1/2022 | Mitra | G06N 3/0499 |
| 2022/0043657 | A1* | 2/2022 | Gupta | G06F 9/545 |
| 2022/0157048 | A1* | 5/2022 | Ting | G06N 3/084 |
| 2022/0189176 | A1* | 6/2022 | Liu | G06V 10/761 |
| 2022/0269930 | A1* | 8/2022 | Lee | G06F 17/16 |
| 2022/0283984 | A1* | 9/2022 | Kim | G06F 9/3001 |
| 2023/0059976 | A1* | 2/2023 | Mathaikutty | G06N 3/0495 |
| 2023/0075932 | A1* | 3/2023 | Sikka | G06N 3/0464 |
| 2023/0105112 | A1* | 4/2023 | Kim | G06V 10/7715 375/240.08 |
| 2023/0274140 | A1* | 8/2023 | Han | G06N 3/0464 706/25 |
| 2023/0298322 | A1* | 9/2023 | Ndiour | G06V 10/82 382/100 |
| 2023/0306719 | A1* | 9/2023 | Guo | G06N 3/0464 |
| 2023/0401826 | A1* | 12/2023 | Guo | G06V 10/82 |
| 2024/0152738 | A1* | 5/2024 | Park | G06N 3/08 |
| 2024/0161321 | A1* | 5/2024 | Ono | H04N 13/261 |
| 2024/0296649 | A1* | 9/2024 | Kim | G06N 3/08 |
| 2025/0069276 | A1* | 2/2025 | Peng | G06T 3/4046 |
| 2025/0086227 | A1* | 3/2025 | Moon | G06F 16/7328 |
| 2025/0191192 | A1* | 6/2025 | Kwong | G06V 10/806 |
| 2025/0356630 | A1* | 11/2025 | Nakamura | G06T 7/00 |

OTHER PUBLICATIONS

Otatti, Fabrizio, "TrueNorth: A Deep Dive Into IBM's Neuromorphic Chip Design", Open Neuromorphic, [Online] Retrieved from the Internet: <URL: https://open-neuromorphic.org/blog/truenorth-deep-dive-ibm-neuromorphic-chip-design/>, (Mar. 27, 2023), 18 pgs.

"International Application Serial No. PCT/US2025/012555, International Search Report mailed May 13, 2025", 2 pgs.

"International Application Serial No. PCT/US2025/012555, Written Opinion mailed May 13, 2025", 6 pgs.

Zhu, Zeqi, et al., "CATS: Combined Activation and Temporal Suppression for Efficient Network Inference", IEEE/CVF Winter Conference on Applications of Computer Vision (WACV), IEEE, (Jan. 3, 2024), 8151-8160.

* cited by examiner

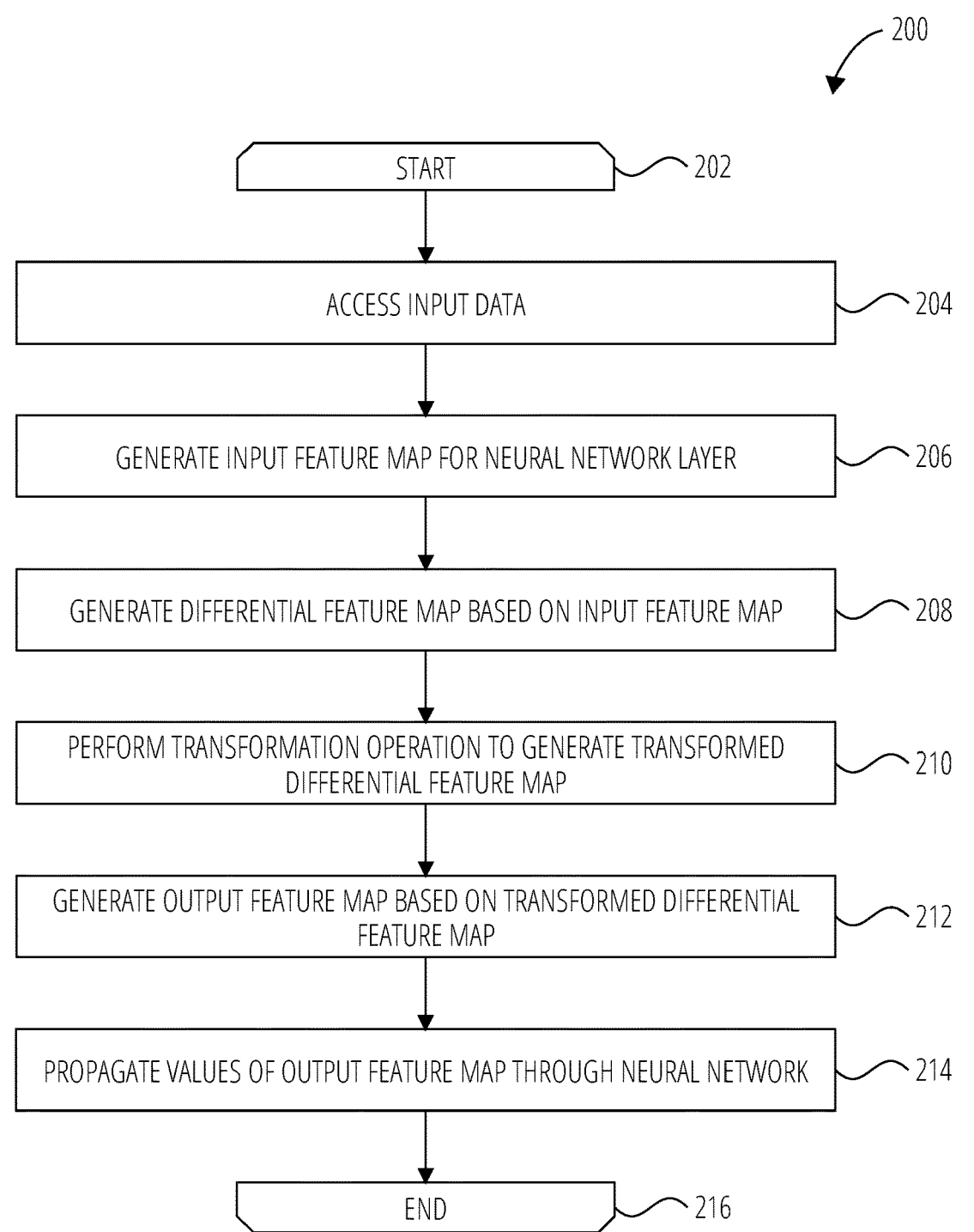

200

START — 202

ACCESS INPUT DATA — 204

GENERATE INPUT FEATURE MAP FOR NEURAL NETWORK LAYER — 206

GENERATE DIFFERENTIAL FEATURE MAP BASED ON INPUT FEATURE MAP — 208

PERFORM TRANSFORMATION OPERATION TO GENERATE TRANSFORMED DIFFERENTIAL FEATURE MAP — 210

GENERATE OUTPUT FEATURE MAP BASED ON TRANSFORMED DIFFERENTIAL FEATURE MAP — 212

PROPAGATE VALUES OF OUTPUT FEATURE MAP THROUGH NEURAL NETWORK — 214

END — 216

FIG. 2

SPATIAL SPARSITY EXPLOITATION IN NEURAL NETWORK PROCESSING

TECHNICAL FIELD

The subject matter disclosed herein relates to neural network processing. More specifically, but not exclusively, the subject matter relates to techniques for reducing the computational load associated with processing a neural network.

BACKGROUND

Neural networks are commonly used to process data. For example, neural networks are often used in the processing of image or video data for tasks such as object detection and object tracking. To execute a trained neural network with respect to an image, image data may be passed through layers of the neural network, with each layer performing computations to extract features or otherwise create useful outputs.

The processing of a neural network can be computationally intensive. In many computing devices, such as wearable devices or edge devices with relatively limited resources, it may be desirable to reduce the number of computations required to execute a neural network in order to reduce overall computational load on the computing device (and therefore also energy consumption, latency, and/or memory usage).

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which:

FIG. 2 is a flowchart illustrating operations of a method suitable for processing an input feature map in a neural network to obtain an output feature map, according to some examples.

DETAILED DESCRIPTION

Figure 1:
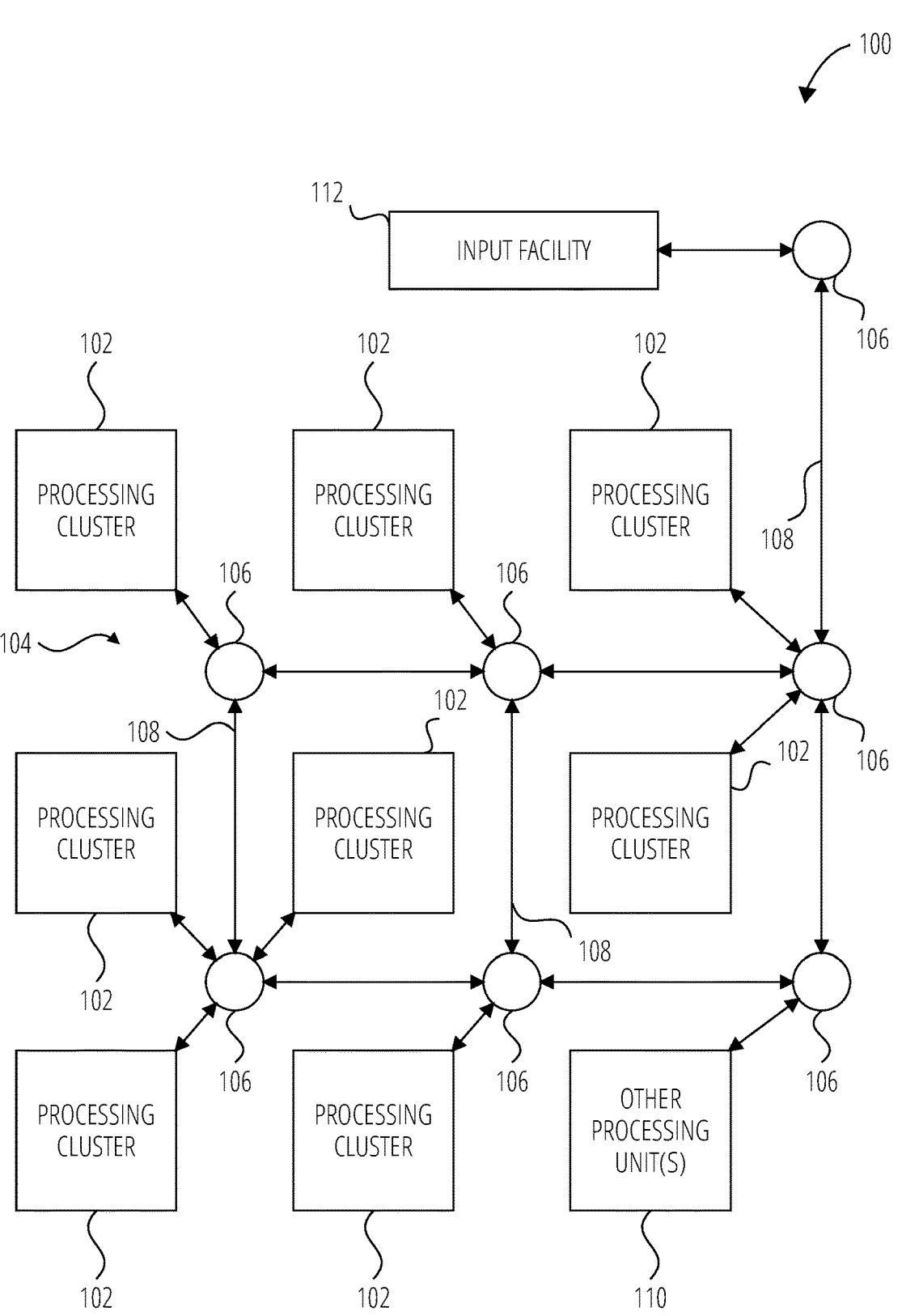
FIG. 1 is a diagrammatic illustration of a processing system, according to some examples.

Examples described herein provide techniques suitable for reducing computational load associated with processing a neural network (and therefore also energy consumption, latency, and/or memory usage of a computing device) by increasing activation sparsity. In some examples, activation sparsity is increased by utilizing correlations between values in spatially close segments of a feature map (e.g., lines (such as rows or columns) channels, or other structural features), and computing outputs for respective segments in a feature map as increments on outputs of respective previous segments. Techniques described herein allow for reuse or leveraging of previously computed outputs, for example, to avoid full computation of certain segments of a feature map.

As mentioned, the processing of a neural network can be computationally intensive. One way in which computational load can be reduced is by reducing the number of activations of neurons in the neural network (e.g., by increasing the proportion of "zero values" in a feature map). This is particularly relevant in the context of event-based processors. For example, in event-based neural processors, such as the Loihi™ processor designed by Intel™ and the TrueNorth™ processor designed by IBM™, suppressed activations can significantly reduce instruction count per inference, which results in decreased energy consumption and latency per inference.

Activation suppression can thus be employed to increase efficiency when processing a neural network. One example technique that can be used to increase activation suppression is performing regularization during model training in an attempt to "force" the neural network to produce fewer activations. Another example technique involves adding trainable thresholds to activation functions (e.g., by allowing a network to learn appropriate threshold values that reduce activations). A third example of an activation suppression technique is referred to as the exploitation of "temporal sparsity." When exploiting temporal sparsity in the context of image processing, the difference between the activation of each neuron in a current frame and a previous frame can, for example, be leveraged. If there is no difference or the difference is negligible (e.g., below a threshold), the value for the previous frame may be reused instead of having to update the activation of the neuron.

While these techniques can reduce the overall number of neural network-related computations, the techniques have certain drawbacks. Regularization and the use of trainable thresholds typically only achieve limited increases in activation suppression, while temporal sparsity may provide further gains. However, while the latter technique can be effective where there is a strong temporal connection between inputs (e.g., in video data with strongly time-correlated frames), it is typically not useful where no such connection exists. Furthermore, temporal sparsity requires storing all neuron activations of at least a previous frame in order to assess differences relative to a current frame, which may consume significant memory resources. This storage requirement may be especially punitive in embedded or edge applications.

Instead of, or in addition to, exploiting temporal correlations between activations, it is possible to exploit correlations between values within a feature map that are spatially close to each other (e.g., adjacent values). For example, adjacent lines (e.g., adjacent rows or adjacent columns) in a single feature map may have similar values. In the case of image processing, this may be related to adjacent input lines having relatively similar pixel-by-pixel values.

Techniques described herein may therefore be used to exploit "spatial sparsity" to reduce computational load. In some examples, a processing system executes efficient difference or delta computations to exploit spatial sparsity within a frame. Spatial sparsity is exploited to reduce the number of activations in the execution of a neural network. Where computations are performed segment-by-segment, exploiting locality within a frame may require less storage than exploiting locality between frames (e.g., one line can be stored at a time, as opposed to a full feature map). Furthermore, spatial sparsity exploitation techniques may operate within a single feature map, obviating the need for a strong temporal correspondence between subsequent inputs (e.g., consecutive image frames).

Example methods for processing a neural network may be performed for each of a plurality of feature maps in the neural network. Accordingly, while some descriptions herein focus on operations performed with respect to a single feature map, it will be appreciated that similar operations may be performed to process multiple feature maps within the neural network. Furthermore, the term "input feature map" refers to any feature map that is processed or transformed using operations as described herein, and the term "output feature map" refers to output of such a process. Accordingly, in this context, the terms "input" and "output" are used relative to the operations or measures applied to a feature map, not relative to the neural network as a whole. For example, an "input feature map" is not necessarily an earliest or first-layer feature map in a neural network (or input to an initial layer) since it can be the output of a preceding layer, and an "output feature map" is not necessarily final output of a neural network since it can be used as input in a subsequent layer.

The method for processing a neural network may include accessing, by one or more processors, an input feature map comprising a first set of values. The method may further include generating, by the one or more processors, a differential feature map comprising a second set of values. At least a subset of the second set of values may be obtained based on differences between corresponding values of the first set of values in respective spatially adjacent segments of the input feature map. For example, differences between corresponding values in adjacent lines (e.g., consecutive rows or consecutive columns) may be obtained.

In some examples, the one or more processors perform a predetermined transformation operation with respect to at least a subset of the second set of values to generate a transformed differential feature map comprising a third set of values. The one or more processors may generate an output feature map comprising a fourth set of values. At least a subset of the fourth set of values may be obtained by accumulating respective values of the third set of values with corresponding values of the fourth set of values that were previously generated in the output feature map. The respective values of the third set of values and the corresponding values of the fourth set of values may be in respective spatially adjacent segments of the transformed differential feature map and the output feature map. For example, values for a particular line of the output feature map may be obtained by accumulating values in the same line of the transformed differential feature map with corresponding values already generated for a preceding line of the output feature map.

Different types of segments may be compared or utilized in examples described herein, and spatial sparsity exploitation is thus not restricted, for example, to adjacent lines (e.g., adjacent rows or adjacent columns). For example, the respective spatially adjacent segments of the input feature map may be respective spatially adjacent lines (e.g., rows or columns), respective spatially adjacent channels, or respective spatially adjacent blocks of predefined dimensions. The respective spatially adjacent segments of the transformed differential feature map and the output feature map may be respective lines (e.g., rows or columns) in the output feature map that are spatially adjacent to respective rows in the transformed differential feature map, respective channels in the output feature map that are spatially adjacent to respective channels in the transformed differential feature map, or respective blocks in the output feature map that are spatially adjacent to respective channels in the transformed differential feature map (the blocks having, for example, predefined dimensions).

The neural network may be a convolutional neural network (CNN). The predetermined transformation operation may comprise convolving the transformed differential feature map with a kernel. The predetermined transformation operation may also comprise one or more other computations, such as application of an activation function.

Techniques described herein may, however, utilize one or more of various predetermined transformation operations. For example, the predetermined transformation operation may comprise convolution, batch normalization, a fully-connected layer operation, transpose-convolution, depth-wise-convolution, or matrix multiplication. Furthermore, while a CNN is used as an example to illustrate techniques described herein, it is noted that one or more techniques in the present disclosure may find application in other types of neural networks, such as transformers, spiking neural networks (SNNs), or multilayer perceptrons (MLP). Each value in the first set of values may represent an activation of a neuron of a preceding layer of the neural network. The fourth set of values may represent output of a current layer of the neural network, with the method further including propagating, by the one or more processors, at least a subset of the fourth set of values to a subsequent layer of the neural network.

In some examples, convolution of the transformed differential feature map comprises event-driven convolution in which, for each value of the second set of values, the value is only processed if the value satisfies a predetermined threshold. In other words, the convolution operation is only performed where events (e.g., values that satisfy the predetermined threshold) are detected. An activation function may be applied selectively only to those values that are convolved (e.g., after the convolution operation on a value) to further reduce overall computations.

In some examples, the method includes performing, by the one or more processors, a thresholding operation by detecting that one or more values of the second set of values is at or below an approximation threshold and, in response to detecting that the one or more values of the second set of values is at or below the approximation threshold, setting the one or more values of the second set of values to zero in the differential feature map. This may further reduce overall computations.

To reduce memory requirements, techniques described herein may operate by performing computations segment-by-segment instead of computing and storing, for example, an entire differential feature map prior to generating an output feature map. For example, the generation of the differential feature map may be at least partially executed in a segment-by-segment manner such that each of one or more segments of the differential feature map is generated using element-wise differences between the respective spatially adjacent segments of the input feature map. As another example, the generation of the output feature map may be at least partially executed in a segment-by-segment manner such that each of one or more segments of the output feature map is generated using element-wise accumulation between the respective spatially adjacent segments of the transformed differential feature map and the output feature map.

In some examples, the generation of the differential feature map includes assigning values of the second set of values for a first segment of the differential feature map by using corresponding values from the first set of values directly, and obtaining values for a plurality of other segments of the differential feature map based on the differences between corresponding values of the first set of values in respective spatially adjacent segments of the input feature map. In some examples, the generation of the output feature map includes assigning values of the fourth set of values for a first segment of the output feature map by using corresponding values from the third set of values directly, and obtaining values for each of a plurality of other segments of the output feature map by accumulating the respective values of the third set of values with corresponding values of the fourth set of values that were previously generated in the output feature map.

As mentioned, techniques described herein may be applied for computationally efficient image processing (e.g., in machine learning applications such as object detection or object tracking). An image frame may be captured using an optical device, such as one or more cameras. The method may include accessing, by the one or more processors, the image frame and processing the image frame to obtain the input feature map. In some cases, each value in the first set of values may be an activation value associated with one or more features of the image frame.

While image processing is described in certain examples of the present disclosure, techniques described herein may be applied to other types of data (e.g., to feature maps that do not represent image features). For example, techniques described herein may be utilized for computationally efficient processing of audio, data tables, signals, or other inputs that, for example, can be transformed into a matrix format. Accordingly, unless otherwise specified herein, a feature map referred to in this disclosure does not necessarily relate to a feature map that represents an image frame (or features of the image frame).

Furthermore, techniques described herein may be applied to various types of feature maps, and are not limited to feature maps of specific shapes or dimensions. For example, it is noted that the input feature map and the output feature map may be multi-channel feature maps, and operations in the method, such as the generation of the differential feature map and performing the predetermined transformation operation, may be performed for each channel.

A processing system may include one or more processors configured to process a neural network by performing one or more of the operations discussed above. The one or more processors may include or provide an event-based neural processor comprising one or more processing clusters. The event-based neural processor may be configured to apply event-driven convolution operations in which, for each value in the second set of values, the value is only processed by the event-based neural processor (e.g., by processing elements in one or more of the processing clusters) if the value satisfies a predetermined threshold.

One or more processors implementing techniques described herein may thus provide an accelerator that leverages spatial sparsity.

Example techniques described herein may be implemented by a computing device. The computing device may include a processing system as discussed above.

The computing device may be an XR device, such as an augmented reality (AR) or virtual reality (VR) device, that includes the processing system as discussed above. The XR device may further include an optical device communicatively coupled to the processing system. The XR device may be configured to capture an image frame using the optical device and process, using the processing system, the image frame to obtain the input feature map. The XR device may thus apply spatial sparsity techniques described herein to reduce overall computational load associated with processing a neural network (e.g., when processing image or video data through the neural network). For example, the XR device may be enabled to perform gesture recognition in a more computationally efficient manner by utilizing these techniques.

When the effects in this disclosure are considered in aggregate, one or more of the methodologies described herein may obviate a need for certain efforts or resources that would otherwise be involved in processing or executing a neural network. Such resources may include processor resources, memory resources, or power/battery resources.

Since values in adjacent or spatially close segments of a feature map may be similar, leveraging these similarities can reduce the number of computations that need to be performed to execute a neural network. For example, the differential feature map may contain more zero (or near-zero) values than the input feature map due to the input feature map containing similar values in respective adjacent segments, and convolving the differential feature map instead of the input feature map may thus reduce the computational load on a processing system. Examples described herein may therefore address or alleviate the technical problem of reducing the computational load associated with executing a neural network.

Reducing computational load may in turn result in lower latency. Furthermore, as a result of reducing the number of computations, energy consumption of a processing system may be reduced. Examples described herein may thus also address or alleviate the technical problem of lowering latency and/or reducing energy consumption or overall energy needs of a computing device or processing system.

Moreover, examples described herein may address or alleviate the technical problem of reducing memory requirements or memory resource consumption of a computing device or processing system. For example, by only storing a previous segment instead of an entire previous feature map (e.g., in the context of temporal sparsity techniques), memory resources may be freed up and/or overall memory resource requirements may be reduced.

FIG. 1 illustrates a processing system 100 according to some examples. The processing system 100 is configured for event-based processing tasks. In some examples, the components of the processing system 100 are integrated into a single processing unit (e.g., a Neural Processing Unit). For example, the processing system 100 may be implemented as a Neural Processing Unit in an Application-Specific Instruction Processor (ASIP) designed to facilitate inference on edge-of-cloud devices.

The processing system 100 includes a plurality of processing clusters 102, which are interconnected by a network 104. The network 104 functions as a message exchange network for exchange of messages, including event messages, instruction messages, configuration messages, or other messages, depending on the implementation. Messages may thus include instructions to perform computations, configuration instructions, or other data.

The network 104 includes nodes 106 forming an interface with respective processing clusters 102 and links 108 between the nodes 106. Processing units of one or more other types, such as one or more other processing unit(s) 110 as shown in FIG. 1, may also be included in the processing system 100 and coupled to the network 104. For example, the one or more other processing unit(s) 110 may include a digital signal processor, general purpose processor (e.g., a Central Processing Unit (CPU)), host processor, or Graphics Processing Unit (GPU).

In some examples, each processing cluster 102 has a message receiving facility to receive event messages via the network 104 and a message transmitting facility to transmit event messages via the network 104. Each of the processing clusters 102 may include one or more processing elements (not shown). Each processing element may be a neural processing element that, in the context of neural network processing, mimics the behavior of a biological neuron (at least to some extent), as is described further below.

Each of the processing clusters 102 may include its own local memory or cache, allowing for rapid data access. For example, a neuromorphic state memory may store values representative of a neuromorphic state associated with one or more processing elements. Processing elements may have their own respective memory storing their state or other information, or each processing cluster 102 may have a memory that stores state or other information for multiple processing elements.

In some examples, each processing cluster 102 has its own static random-access memory (SRAM) (e.g., 256 kB of SRAM). Neuromorphic states may be calculated using, for example, 16-bit floating point.

The processing system 100 may further include an input facility 112 that is configured to receive input data. The input facility 112 may also selectively map messages. As a result, the processing clusters 102 may not only transmit messages directly, but may also have their messages indirectly redirected and broadcast via the input facility 112. For example, the input facility 112 can be configured to receive messages with message content and determine the destination of each respective message (e.g., using a mapping function and/or an element address and/or data values in the messages).

Different processing clusters 102 may be configured for different tasks. For example, some clusters may be dedicated to performing basic arithmetic computations, some clusters may be dedicated to neuromorphic computations, and other clusters may be dedicated to performing complex mathematical operations. In some examples, the processing clusters 102 are configured to perform neural network processing, while the one or more other processing unit(s) 110 perform other computational tasks. Alternatively or additionally, processing clusters may be provided that are capable of being reconfigured to perform one of various classes of operations. Likewise, a processing cluster may have a plurality of processing elements that may have the same functionality or different functionalities, or may be reconfigured to have a particular functionality.

Each processing element may be designed or configured to detect and generate event messages based on specific computational rules (e.g., spike when a threshold is exceeded). Neuromorphic states may be dynamically updated based on received event messages and computations performed within a processing cluster 102. In some examples, if the value of a neuromorphic state approaches or exceeds a threshold potential, the corresponding processing element can issue a control signal, prompting the message transmitting facility to send out one or more event messages (e.g., to other processing clusters 102 in the processing system 100).

The processing system 100 can be employed in various applications, such as image processing, audio processing, machine learning, pattern recognition, or real-time data analytics. For example, in an image processing application, the processing clusters 102 may be utilized to perform convolutional operations on image data, while another processing unit (e.g., the other processing unit(s) 110) may handle tasks such as image rendering or video encoding.

The processing system 100 may efficiently handle layer-by-layer processing in a neural network context. As described in greater detail below, the processing system 100 may utilize the processing elements in the processing clusters 102 to perform convolution operations that involve applying kernels, or filters, over input data (e.g., image data) to create feature maps. The processing elements may also apply other operations, such as activation functions. In some examples, different layers of the neural network may be assigned to different subsets of the processing clusters 102 for efficient execution.

Deep neural networks (e.g., CNNs) comprise a plurality of neural network layers. Each neural network layer typically includes a plurality of neural network computation elements. Neural network computation elements in a layer may receive weighted inputs from neural network computation elements in a preceding layer or an input device and in turn may have outputs to neural network computation elements in a succeeding layer. The specific way in which a neural network layer is connected to a preceding layer depends on its type. By way of example, in a fully-connected layer, each neural network computation element may receive an input from a neural network computation element in a preceding layer. In a convolutional layer, each neural network computation element may receive an input from a neural network computation element of a preceding layer that is within the range of a convolution kernel centered around a local address corresponding to a local address in the convolutional layer. A pooling layer is used for a spatial dimension reduction. Respective neural network computation elements of a pooling layer correspond to respective sets of neural network computation elements in the preceding layer. A pooling operation for a respective neural network element of a pooling layer, for example, involves selecting a value from its respective set of neural network elements in the preceding layer, such as sampling a maximum value, a minimum value, a median value or a value of a specific one of the respective set of neural network elements. Alternatively, the pooling operation involves computing the average value from the respective set of neural network elements in the preceding layer.

An event-based or message-based processing system, such as the processing system 100, can be configured as a deep neural network. In such cases, at least some of the processing elements of the processing clusters 102 are configured as neural network computation elements that may function as described above. In some examples, the processing elements may be provided as dedicated hardware that function as neural network computation elements. In other examples, this can be achieved by configuring the processing system 100 such that the processing elements are programmable to function as neural network computation elements. In some examples, each processing element has a dedicated processor, while in other examples, the processing elements of a processing cluster 102 share a processor. In operation, the processing elements of the processing clusters 102 may thus, when configured or functioning as neural network elements, receive input messages and transmit output messages via the network 104.

In some examples, each processing cluster 102 functions as a neuron core. Each processor cluster 102 may be configured to operate using single instruction, multiple data (SIMD) processing. For example, each processing cluster 102 may be configured to perform a single instruction on four data inputs in parallel.

In some examples, since each processing cluster 102 has its own processing capabilities and memory, it is possible to scale the neuron capacity of the processing system 100 to create a mesh network-on-chip (NOC) of neuron cores of a desired size, capacity, or performance.

Figure 3:
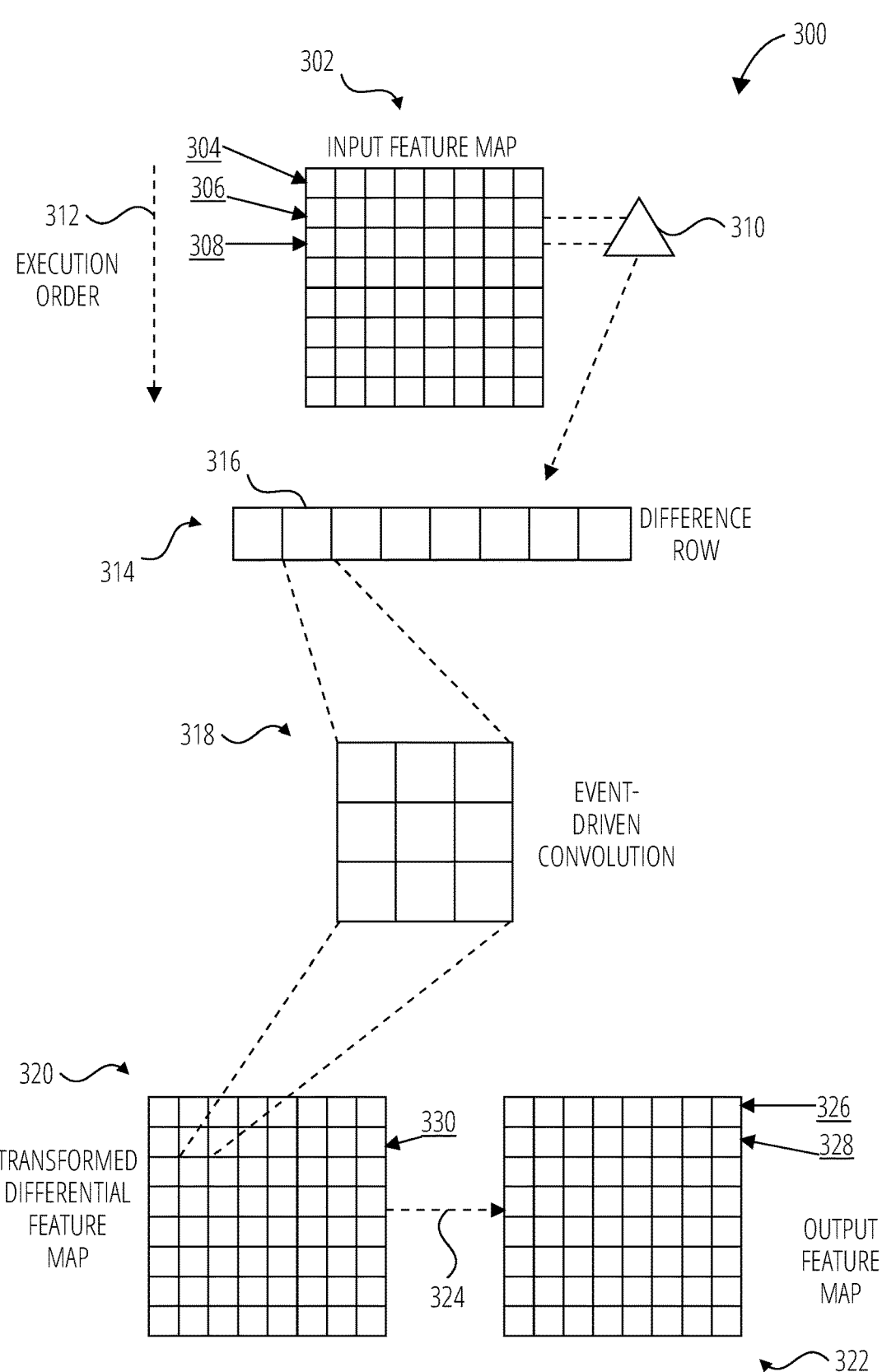
FIG. 3 diagrammatically illustrates various aspects of processing of an input feature map in a neural network to obtain an output feature map, according to some examples.

When processing a neural network, the processing system 100 implements event-based processing. For example, a neuron activation is only propagated through the network 104 if its value constitutes an "event" (e.g., a value is non-zero or exceeds a threshold value). The processing system 100 therefore exploits sparsity by, for example, only considering certain values as "events." Since only active neurons transmit data, when compared to a conventional architecture that may process all neuron values, this reduces the volume of data that needs to be processed and transferred, enhancing efficiency. Examples described herein allow for activations to be suppressed, or further suppressed, by leveraging spatial sparsity. FIG. 2 and FIG. 3 illustrate example techniques for such spatial sparsity exploitation.

FIG. 2 is a flowchart illustrating operations of a method 200 suitable for processing an input feature map in a neural network to obtain an output feature map, according to some examples. By way of example and not limitation, aspects of the method 200 may be performed by a computing device equipped with the processing system 100 of FIG. 1, or components thereof. However, the processing system 100 is a non-limiting example of a system that can perform the method 200, and it will be appreciated that the method 200 may also be performed using one or more other systems, processors, devices, or architectures. While the description of the method 200 focuses on a single input feature map, it will be appreciated that the computing device may perform operations of the method 200 with respect to multiple input feature maps (e.g., all feature maps of the neural network).

The method 200 commences at opening loop element 202, and proceeds to operation 204 where the computing device accesses input data. By way of example and not limitation, the method 200 of FIG. 2 may involve processing of input data in the form of (or including) an image frame, such as a digital image captured by a camera, through a layer of a neural network. However, one or more operations of the method 200 may be applied to exploit spatial sparsity in other data processing applications involving other types of input data (e.g., audio data or database tables).

The computing device may, for example, be a personal computing device, a server, a shared computing node, an edge device, or another device, such as an XR device. Where the input data comprises an image frame, the image frame may comprise digital image data (e.g., pixel data) for an image captured by a camera. However, the image frame may be sourced from various other inputs, such as a video feed, a data storage device, or a network stream. An image frame may be processed through the neural network, for example, to identify certain visual features or objects. In the case of FIG. 2 (as well as FIG. 3 which is discussed below), the neural network is a CNN.

At operation 206, the computing device generates an input feature map based on the input data. For example, the input feature map may be one of a plurality of feature maps for a particular neural network layer. The input feature map is a structured representation of the input data, or aspects or parts thereof (e.g., image features in the case of an image frame being the input data).

For example, in a two-dimensional feature map, the representation may be provided by rows and columns of values, or activations. This feature map serves as the input to the neural network layer. In the case of image processing, for a first neural network layer, an input feature map may represent raw pixel values, while for subsequent layers, the input feature map may represent outputs from previous layers.

The method 200 proceeds to operation 208, where, instead of directly processing (e.g., convolving) the input feature map to obtain transformed values for an output feature map, the computing device first generates a differential feature map based on the input feature map. The computing device uses a first set of values of the input feature map to compute a second set of values representing the differential feature map. At least a subset of the second set of values is obtained based on differences between corresponding values of the first set of values in respective spatially adjacent segments of the input feature map. This may involve computing the element-wise differences between adjacent segments (e.g., lines, such as rows or columns) of the input feature map.

The differential feature map highlights the changes or variations between these segments of the same input feature map, which can be exploited to reduce computational load in subsequent processing steps. For example, where the segments are rows, a first row of the differential feature map may be obtained by using the first row of the input feature map directly, while other rows of the differential feature map may each be obtained by taking the element-wise difference of consecutive rows in the input feature map. For example, row 2 of the differential feature map may be obtained by subtracting values in row 1 of the input feature map from their corresponding values in row 2 of the input feature map, row 3 of the differential feature map may be obtained by subtracting values in row 2 of the input feature map from their corresponding values in row 3 of the input feature map, and so forth. While the example above applies to rows, it is noted that similar steps may be performed, mutatis mutandis, in other examples in which other segments, such as adjacent columns, are considered.

At operation 210, the differential feature map is then further processed (e.g., convolved) instead of directly processing the input feature map further. For example, the computing device may perform one or more predetermined transformation operations, such as convolutions, pooling, and activation functions, on the second set of values of the differential feature map.

In some examples, the computing device performs event-driven processing (e.g., using the processing system 100) such that only non-zero values, or values that differ sufficiently from zero according to a predetermined threshold, are convolved. Since adjacent segments in the input feature map may be relatively similar, the differential feature map may include more "non-activations" than the input feature map, resulting in fewer computations to finalize the processing of the differential feature map when compared to a scenario in which the input feature map is instead processed directly. In this way, the method 200 may leverage spatial sparsity within a single frame (e.g., as opposed to temporal sparsity, which leverages sparsity between different frames).

The processing of the differential feature map in this manner yields a transformed differential feature map. As mentioned, the transformation operation may include convolution with a kernel or filter, application of an activation function, or other operations that modify the values of the differential feature map to produce the transformed differential feature map. The transformed differential feature map thus includes a third set of values.

In some examples, the differential feature map is generated in a segment-by-segment (e.g., row-by-row) manner and segments are then transformed and processed downstream as they arrive. In this way, memory requirements may be reduced as the computing device does not need to store values for the full differential feature map at any given point in time (e.g., rows that have already been processed can be overwritten with new row data).

At operation 212, the method 200 includes generating the output feature map based on the transformed differential feature map. The transformed differential feature map is based on difference values within the input feature map, and a "reconstruction" operation is accordingly performed to obtain a final output feature map that includes a fourth set of values. In other words, with the generation of the differential feature map, values are transformed from an "absolute domain" to a "differential domain." This transformation is reversed in operation 212 to bring the values back to the "absolute domain."

In operation 212, the computing device may generate at least a subset of the fourth set of values by accumulating respective values of the third set of values with corresponding values of the fourth set of values that were previously generated in the output feature map. The respective values of the third set of values and the corresponding values of the fourth set of values may be in respective spatially adjacent segments of the transformed differential feature map and the output feature map. In other words, operation 212 may include integrating transformed values contained in the transformed differential feature map to reconstruct or assemble an output feature map that represents the output of the neural network layer.

For example, where the segments are rows, to generate a first row of the output feature map, the first row of the transformed differential feature map can be used directly (as the first row of the differential feature map mirrored the first row of the input feature map and these values need not be brought back to the "absolute domain"), while subsequent rows are accumulated with adjacent row values. For example, row 2 of the output feature map may be obtained by adding values in row 2 of the transformed differential feature map to their corresponding values in row 1 of the output feature map (row 1 having been generated previously), row 3 of the output feature map may be obtained by adding values in row 3 of the transformed differential feature map to their corresponding values in row 2 of the output feature map (row 2 having been generated previously), and so forth. While the example above applies to rows, it is noted that similar steps may be performed, mutatis mutandis, in other examples in which other segments, such as adjacent columns, are considered.

Again, operation 212 may be performed in a segment-by-segment fashion, without having to store and wait for a full transformed differential feature map to start generating the output feature map. This may further reduce memory requirements. The computing device may apply a predetermined execution order to ensure segment-by-segment processing is carried out correctly (e.g., by starting with a first line (such as row 1) and handling consecutive lines until the final line is reached).

The output feature map contains the processed information that can be propagated to subsequent layers of the neural network, where relevant. At operation 214, the computing device causes propagation of the fourth set of values (of the output feature map) through the neural network. For example, in an image processing application, the values may be processed through further layers as part of an object detection algorithm to detect an object in the image frame.

The method 200 concludes at closing loop element 216. The values of the output feature map may serve (either directly or indirectly) as inputs to a subsequent layer, and processing in the subsequent layer may be performed in a similar manner. Accordingly, and as also mentioned above, while the method 200 has been described with respect to a single feature map of a single layer, it will be appreciated that the method 200 may be employed with respect to any number of feature maps and within any number of layers of a neural network, depending on the implementation.

FIG. 3 is a diagram 300 illustrating various aspects of processing of an input feature map in a neural network to obtain an output feature map, according to some examples. By way of example and not limitation, aspects shown in FIG. 3 may be performed by a computing device equipped with the processing system 100 of FIG. 1, or components thereof. However, the processing system 100 is a non-limiting example, and it will be appreciated that one or more other systems, processors, devices, or architectures may also be utilized.

An input feature map 302 is depicted in FIG. 3. The input feature map 302 includes a plurality of rows and columns, including a first row 304, a second row 306, and a third row 308 (among others). Each element in the input feature map 302 represents an activation of a neuron in the context of the neural network (e.g., from a preceding layer of the neural network), and such neurons may be implemented, for example, using the processing system 100 as described with reference to FIG. 1. Where event-driven processing is applied, activations are only propagated through the neural network if they constitute events (e.g., if they have non-zero values or meet some other threshold).

In the diagram 300, the segments that are analyzed to perform difference computations and accumulation computations are the respective rows of the input feature map 302. The following parameters may be defined to perform "spatial-delta" computations according to examples herein, where the adjacent segments considered in the operations are rows, and where the predetermined transformation operation is a convolution operation. It will, however, be appreciated that similar techniques may be applied, mutatis mutandis, when considering other types of lines (e.g., columns) or segments other than lines (e.g., feature map channels or blocks of a feature map), or other transformation operations.

i is the input feature map, such that $i(x,y)$ represents the value of the activation with column coordinate x and row coordinate y in the input feature map;

o is the output feature map;

k is the kernel of the convolution that computes $o=i*k$, where * represents the convolution operation;

d is the differential feature map (which may also be referred to as a spatial difference frame, e.g., in the context of image processing), computed row-by-row as the element-wise difference between one row and the previous row in i; and o' is the transformed differential feature map, the result of convolving d by k, and thus $o'=d*k$.

Different convolution settings may be applied. For example, the convolution may be strided or transposed, depending on the implementation.

The following equation may then be utilized to compute the differential feature map:

13

$$d(x, y) = \begin{cases} i(x, 0), & y = 0 \\ i(x, y) - i(x, y-1), & y > 0 \end{cases} \quad \text{(Equation 1)}$$

Alternatively, the differential feature map may be computed as follows:

$$d(x, y) = \begin{cases} 0, & y = -1 \\ i(x, y) - i(x, y-1), & y \geq 0 \end{cases} \quad \text{(Equation 2)}$$

This first computation (Equation 1 or Equation 2) yields element-wise differences between respective pairs of rows, highlighting the changes or deltas between them. The computing device thus considers consecutive pairs of rows and uses the differences between corresponding values as the values of the differential feature map.

As mentioned, the differential feature map may be computed in a row-by-row manner to decrease latency and/or reduce memory requirements (e.g., according to an execution order 312 as shown in FIG. 3). The diagram 300 conceptually illustrates how a difference computation 310 is performed with respect to the third row 308 to yield a difference row 314 (e.g., one of a plurality of rows of the differential feature map).

To obtain the values of the transformed differential feature map, the convolution o'=d*k is performed. In some examples, and as is the case in the diagram 300 of FIG. 3, the convolution operation is event-driven, and only values that satisfy a threshold are convolved (e.g., non-zero values or values that meet some other threshold). Values that do not satisfy the threshold are not propagated, thus reducing computations.

As an example, an activated neuron 316 in the difference row 314 of the differential feature map is depicted in FIG. 3. The value of the activated neuron 316 is computed by subtracting the i(2,2) value of the second row 306 of the input feature map 302 from the i(2,3) value of the third row 308 of the input feature map 302. The computing device detects that the activated neuron 316 meets the relevant threshold or is non-zero, and event-driven convolution 318 is performed on the activated neuron 316, as is also conceptually illustrated in FIG. 3.

With respect to the difference row 314 as a whole, the event-driven convolution 318 may involve convolving the difference row 314 with a kernel or filter, but only for the elements where there is a non-zero value or where a threshold is satisfied.

The result of the convolution process, once performed with respect to all relevant elements in the differential feature map, is a transformed differential feature map 320. This feature map represents the convolved differences or deltas and serves as an intermediate step towards generating a final output feature map 322. The diagram 300 of FIG. 3 further conceptually depicts an accumulation operation 324 performed to generate the output feature map 322 from the transformed differential feature map 320.

To obtain the final output, the transformed differential feature map may be row-integrated as follows where Equation 1 is utilized to obtain the differential feature map, and where o[y] represents the row vector for row y of feature map o:

$$o[y] = \begin{cases} o'[y] + o[y-1], & y > 0 \\ o'[y], & y = 0 \end{cases} \quad \text{(Equation 3)}$$

14

Alternatively, to obtain the final output, the transformed differential feature map may be row-integrated as follows where Equation 2 is utilized to obtain the differential feature map, and where o[y] represents the row vector for row y of feature map o:

$$o[y] = \begin{cases} o'[y] + o[y-1], & y \geq 0 \\ 0, & y < 0 \end{cases} \quad \text{(Equation 4)}$$

The following proof illustrates that the aforementioned transformation is correct. It is noted that the proof applies to both generic and event-driven convolution operations.

$$o[y] = i[y] * k = (i[y] - i[y-1] + i[y-1]) * k = \quad (3)$$

$$(d[y] + i[y-1]) * k = d[y] * k + i[y-1] * k = o'[y] + o[y-1]$$

(the result matches Equations (3) and (4)).

The transformed differential feature map 320 thus undergoes the accumulation operation 324 to produce the output feature map 322. The accumulation operation 324 involves adding values from the transformed differential feature map 320 to corresponding values of previously processed rows of the output feature map 322, effectively integrating the changes to "reconstruct" the full output feature map 322.

For example, a first row 326 of the output feature map 322 may be generated by directly using the values of a first row of the transformed differential feature map 320, or by applying the transformation operation to the first row of the input feature map 302, as there is no preceding row to compare for a difference computation. The first row 326 of the output feature map 322 sets the baseline for the accumulation operation 324 that follows. A second row 328 of the output feature map 322 is then generated through the accumulation operation. This operation involves adding the values from the corresponding row of the transformed differential feature map 320, which is the second row 330, to the values of the first row 326 of the output feature map 322, in an element-wise manner. The accumulation operation integrates the differential information to construct the second row 328, reflecting the cumulative effect of the changes from the input feature map 302.

The accumulation operation 324 ensures that the output feature map 322 maintains a coherent representation of the processed data by transforming the data back to the "absolute domain" to match the domain of the input feature map 302. Rows of the output feature map 322 may build upon previous rows, accumulating the changes and preserving spatial relationships within the data. In some examples, an activation function may be applied to the transformed differential feature map or to the output feature map in order to arrive at a final set of values.

When utilizing the aforementioned approach, computing the differential feature map may "cost" one subtraction per element (e.g., [i] subtractions), or slightly less where a first segment (e.g., a first row) is initialized or reused. It is noted that significant gains may be achieved with respect to the transformation operation performed on the differential feature map. For each element in d that is 0 (or below a predefined threshold), |k| computations may, for instance, be removed from the convolution. In this way, value similarity in spatially close segments is exploited to reduce the number of computations required. When computing o from o', |o| additions may be required, or slightly less where a first segment (e.g., a first row) is initialized or reused.

While the examples shown in FIG. 3 relate to two-dimensional feature maps, it is noted that the inputs and outputs may comprise multi-channel data. In other words, both i and o may have a third dimension, z. This may not substantially affect the procedure nor the operations, except that the computing device performs a convolution per input channel (z coordinate) to output channel, and the potential for savings during the difference convolutions may be higher.

In some examples, a thresholding operation can be utilized to further reduce overall activations and thus overall computational load. The thresholding operation may be performed by the computing device by detecting that one or more values of the second set of values is at or below an approximation threshold and setting those one or more values of the differential feature map to zero in the differential feature map. For example, a threshold may be added to the formula to compute d(x,y), such that relatively small differences in $i(x,y)-i(x,y-1)$ can be approximated by zero.

Examples described herein may allow for a decrease in the number of activations in the inference of a neural network, by reusing the values computed for a segment (e.g., a line, such as a row or column) of a feature map to infer the values to be computed for a subsequent segment. The segment-wise spatial sparsity in a particular data set may depend on various factors, such as the size of the feature map, quantization level, or layer depth in the neural network. It has been found that, in some cases, spatial sparsity may be relatively higher for larger feature maps, which may make techniques described herein complementary to temporal sparsity exploitation techniques that may be costly to exploit in layers with larger feature maps (due to the amount of state required).

Figure 4:
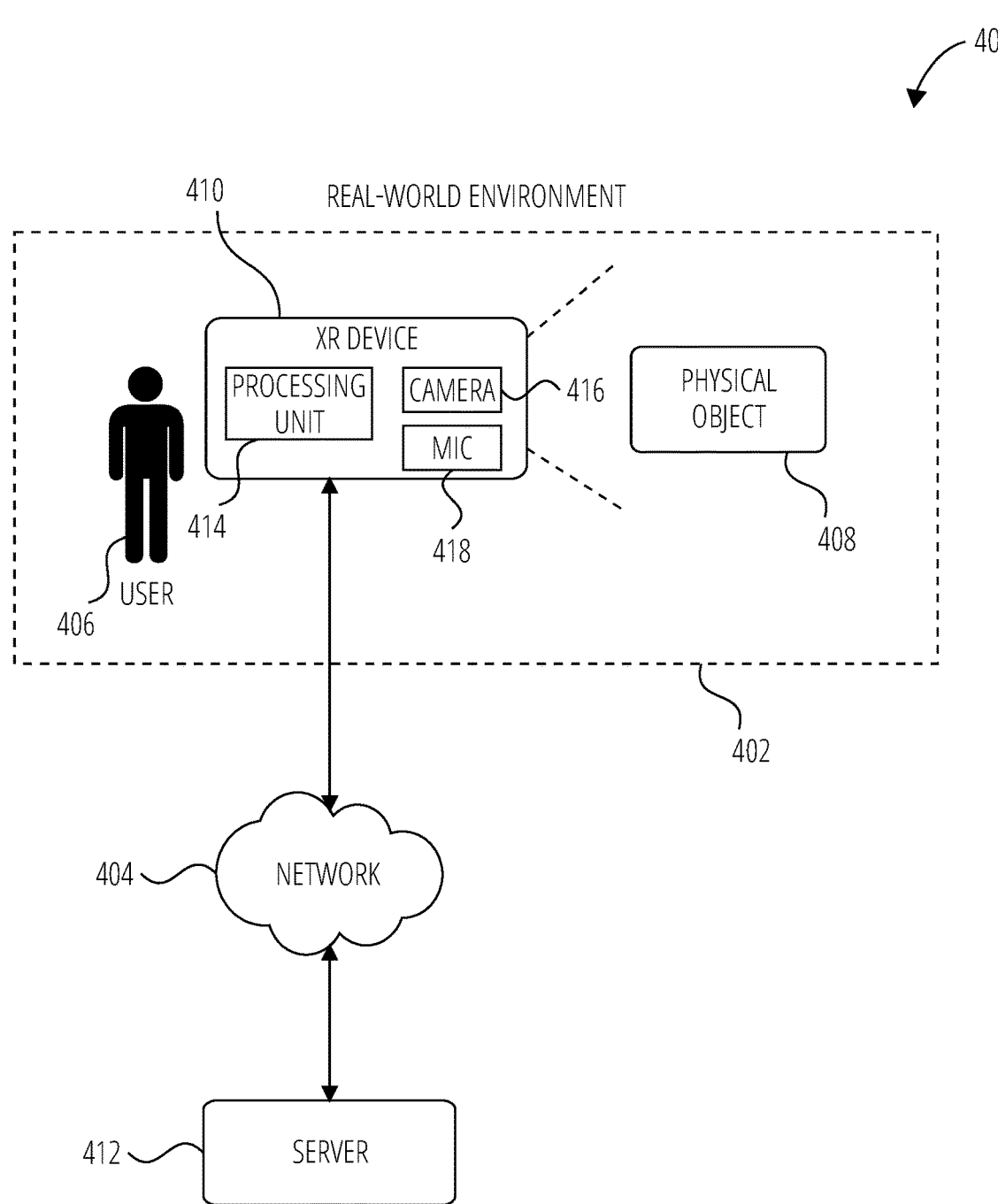
FIG. 4 is a diagrammatic illustration of an extended reality (XR) device that includes a processing unit that is configured to process a neural network, according to some examples.

Referring now to FIG. 4, a diagram is shown to illustrate a network environment 400 suitable for operating an XR device 410, according to some examples. The network environment 400 includes an XR device 410 and a server 412, communicatively coupled to each other via a network 404. The server 412 may be part of a network-based system. For example, the network-based system may be or include a cloud-based server system that provides additional information, such as virtual content (e.g., three-dimensional models of virtual objects, or augmentations to be applied as virtual overlays onto images depicting real-world scenes) to the XR device 410.

The term "XR" refers to "extended reality," which covers augmented reality (AR) and/or virtual reality (VR). The term "AR" refers to an interactive experience of a real-world environment where physical objects or environments that reside in the real world are "augmented" or enhanced by computer-generated digital content (also referred to as virtual content or synthetic content). An AR device can enable a user to observe a real-world scene while simultaneously seeing virtual content that may be aligned to objects, images, or environments in the field of view of the AR device. AR can also refer to a system that enables a combination of real and virtual worlds, real-time interaction, and 3D registration of virtual and real objects. A user of an AR system can perceive virtual content that appears to be attached or interact with a real-world physical object.

The term "VR" refers to a simulation experience of a virtual world environment that is distinct from the real-world environment. Computer-generated digital content is displayed in the virtual world environment. A VR device may block out the field of view of the user with virtual content that is displayed based on a position and orientation of the VR device. VR also refers to a system that enables a user of a VR system to be completely immersed in the virtual world environment and to interact with virtual objects presented in the virtual world environment. In general, AR and VR devices are referred to as XR devices.

Referring again to FIG. 4, a user 406 operates the XR device 410. The user 406 may be a human user (e.g., a human being), a machine user (e.g., a computer configured by a software program to interact with the XR device 410), or any suitable combination thereof (e.g., a human assisted by a machine or a machine supervised by a human). The user 406 is not part of the network environment 400, but is associated with the XR device 410.

The XR device 410 may be a computing device with a display such as a smartphone, a tablet computer, or a wearable computing device (e.g., watch or glasses). The computing device may be hand-held or may be removably mounted to a head of the user 406. The XR device 410 includes various components, including a processing unit 414 and a camera 416. In some examples, the display may be a screen that displays what is captured with the camera 416 of the XR device 410. In other examples, the display of the device may be transparent or semi-transparent such as in lenses of wearable computing glasses. In other examples, the display may be a transparent display such as a windshield of a car, plane, or truck (e.g., as part of a heads-up display system). In another example, the display may be non-transparent and wearable by the user to cover the field of vision of the user.

The user 406 operates an application of the XR device 410. The application may include an AR application configured to provide the user 406 with an experience triggered or enhanced by a physical object 408, such as a two-dimensional physical object (e.g., a picture or navigation prompt), a three-dimensional physical object (e.g., a statue), a location (e.g., a factory), or references (e.g., perceived corners of walls or furniture, or Quick Response (QR) codes) in the real-world environment 402. For example, the user 406 may point the camera 416 of the XR device 410 to capture an image of the physical object 408 and a virtual overlay may be presented over the physical object 408 via the display. Certain experiences may also be triggered, enhanced or controlled by a hand of the user 406. Accordingly, it will be appreciated that the physical object 408 or real-world object being tracked or detected by the XR device 410 may be the hand of the user 406.

To allow the user 406 to have an AR experience and/or interact with virtual objects, the XR device 410 may detect the positions and movements of objects, including, for example, one or both hands of the user 406. The XR device 410 may use hand positions, shapes, or movements to determine the user's intentions in manipulating virtual objects. To this end, the XR device 410 includes tracking components implemented using the processing unit 414. The tracking components may track the pose (e.g., position and orientation) of the XR device 410 relative to the real-world environment 402 using image sensors (e.g., the camera 416 and/or other image sensors), inertial sensors (e.g., a gyroscope, accelerometer, or the like), wireless sensors (e.g., Bluetooth™ or Wi-Fi sensors), a Global Positioning System (GPS) sensor, and/or an audio sensor (e.g., the microphone 418 shown in FIG. 4).

The processing unit 414 may be used to generate tracking estimates or predictions, e.g., to predict the location or pose of a tracked object. The XR device 410 may utilize one or more object tracking machine learning models or one or more object detection machine learning models for this purpose. A specific example of a machine learning model is a trained neural network for gesture recognition.

In this context, a machine learning model may comprise a neural network trained on suitable training data to identify and/or track objects in one or more frames captured by the XR device 410. As mentioned, in some examples, the components of the processing system 100 of FIG. 1 are integrated into a single processing unit. The processing unit 414 of the XR device 410 may comprise an event-driven processing system, such as the processing system 100. Accordingly, the XR device 410 is a (non-limiting) example of a computing device in which the processing system 100 can be implemented. The processing system 100 may, for example, facilitate real-time processing of sensor data captured by the XR device 410, such as image data captured using the camera 416 or audio data captured using the microphone 418.

In some examples, the XR device 410 executes neural networks by exploiting spatial sparsity as described herein, for example, with reference to FIG. 2 and FIG. 3. In this way, computational load on the XR device 410 may be decreased. This may result in improved battery life, lower latency, and reduced memory usage or requirements. The XR device 410 may, for example, apply such techniques in the processing of image data or audio data (e.g., to process feature maps that represent image features or to process feature maps that represent sound features).

In some examples, the server 412 may be used to perform certain detection and tracking based on sensor data (e.g., image and depth data) from the XR device 410. Accordingly, the XR device 410 or the server 412, or both, can perform image processing, object detection and/or object tracking functions based on images captured by the XR device 410 and one or more parameters internal or external to the XR device 410. Accordingly, the server 412 may also, in some examples, benefit from employing spatial sparsity techniques as described herein (e.g., with reference to FIG. 2 and FIG. 3). In some examples, the server 412 may include or be coupled to a processing system such as the processing system 100 of FIG. 1.

The network 404 may be any network that enables communication between or among machines (e.g., server 412), databases, and devices (e.g., XR device 410). Accordingly, the network 404 may be a wired network, a wireless network (e.g., a mobile or cellular network), or any suitable combination thereof. The network 404 may include one or more portions that constitute a private network, a public network (e.g., the Internet), or any suitable combination thereof.

EXAMPLES

In view of the above-described implementations of subject matter this application discloses the following list of examples, wherein one feature of an example in isolation or more than one feature of an example, taken in combination and, optionally, in combination with one or more features of one or more further examples are further examples also falling within the disclosure of this application.

Example 1 is a method for processing a neural network, the method comprising for each input feature map of a plurality of input feature maps in the neural network: accessing, by one or more processors, the input feature map, the input feature map comprising a first set of values; generating, by the one or more processors, a differential feature map comprising a second set of values, at least a subset of the second set of values being obtained based on differences between corresponding values of the first set of values in respective spatially adjacent segments of the input feature map; performing, by the one or more processors, a predetermined transformation operation with respect to at least a subset of the second set of values to generate a transformed differential feature map comprising a third set of values; and generating, by the one or more processors, an output feature map comprising a fourth set of values, at least a subset of the fourth set of values being obtained by accumulating respective values of the third set of values with corresponding values of the fourth set of values that were previously generated in the output feature map, the respective values of the third set of values and the corresponding values of the fourth set of values being in respective spatially adjacent segments of the transformed differential feature map and the output feature map.

In Example 2, the subject matter of Example 1 includes, wherein the neural network comprises a convolutional neural network, and the predetermined transformation operation comprises convolving the transformed differential feature map with a kernel.

In Example 3, the subject matter of Example 1 or 2 includes, wherein the predetermined transformation operation comprises event-driven convolution in which, for each value of the second set of values, the value is only processed if the value satisfies a predetermined threshold.

In Example 4, the subject matter of any of Examples 1-3 includes, wherein each value in the first set of values represents an activation of a neuron of a preceding layer of the neural network.

In Example 5, the subject matter of Example 4 includes, wherein the fourth set of values represents output of a current layer of the neural network, the method further comprising: propagating, by the one or more processors, at least a subset of the fourth set of values to a subsequent layer of the neural network.

In Example 6, the subject matter of any of Examples 1-5 includes, performing, by the one or more processors, a thresholding operation by detecting that one or more values of the second set of values is at or below an approximation threshold and, in response to detecting that the one or more values of the second set of values is at or below the approximation threshold, setting the one or more values of the second set of values to zero in the differential feature map.

In Example 7, the subject matter of any of Examples 1-6 includes, wherein the respective spatially adjacent segments of the input feature map comprise respective spatially adjacent lines or respective spatially adjacent channels.

In Example 8, the subject matter of any of Examples 1-7 includes, wherein the respective spatially adjacent segments of the transformed differential feature map and the output feature map comprise respective lines in the output feature map that are spatially adjacent to respective lines in the transformed differential feature map, or respective channels in the output feature map that are spatially adjacent to respective channels in the transformed differential feature map.

In Example 9, the subject matter of any of Examples 1-8 includes, wherein the generation of the differential feature map is at least partially executed in a segment-by-segment manner such that each of one or more segments of the differential feature map is generated using element-wise differences between the respective spatially adjacent segments of the input feature map.

In Example 10, the subject matter of any of Examples 1-9 includes, wherein the generation of the output feature map is at least partially executed in a segment-by-segment manner such that each of one or more segments of the output feature map is generated using element-wise accumulation between the respective spatially adjacent segments of the transformed differential feature map and the output feature map.

In Example 11, the subject matter of any of Examples 1-10 includes, wherein the generation of the differential feature map comprises assigning values of the second set of values for a first segment of the differential feature map by using corresponding values from the first set of values directly, and obtaining values for a plurality of other segments of the differential feature map based on the differences between corresponding values of the first set of values in respective spatially adjacent segments of the input feature map.

In Example 12, the subject matter of any of Examples 1-11 includes, wherein the generation of the output feature map comprises assigning values of the fourth set of values for a first segment of the output feature map by using corresponding values from the third set of values directly, and obtaining values for each of a plurality of other segments of the output feature map by accumulating the respective values of the third set of values with corresponding values of the fourth set of values that were previously generated in the output feature map.

In Example 13, the subject matter of any of Examples 1-12 includes, accessing, by the one or more processors, an image frame; and processing, by the one or more processors, the image frame to obtain the input feature map, each value in the first set of values being an activation value associated with one or more features of the image frame.

In Example 14, the subject matter of Example 13 includes, capturing the image frame using an optical device.

Example 15 is a processing system comprising one or more processors configured to process a neural network by performing operations comprising, for each input feature map of a plurality of input feature maps in the neural network: accessing the input feature map, the input feature map comprising a first set of values; generating a differential feature map comprising a second set of values, at least a subset of the second set of values being obtained based on differences between corresponding values of the first set of values in respective spatially adjacent segments of the input feature map; performing a predetermined transformation operation with respect to at least a subset of the second set of values to generate a transformed differential feature map comprising a third set of values; and generating an output feature map comprising a fourth set of values, at least a subset of the fourth set of values being obtained by accumulating respective values of the third set of values with corresponding values of the fourth set of values that were previously generated in the output feature map, the respective values of the third set of values and the corresponding values of the fourth set of values being in respective spatially adjacent segments of the transformed differential feature map and the output feature map.

In Example 16, the subject matter of Example 15 includes, wherein the neural network comprises a convolutional neural network, and the predetermined transformation operation comprises convolving the transformed differential feature map with a kernel.

In Example 17, the subject matter of Examples 15-16 includes, wherein the one or more processors comprises an event-based neural processor comprising one or more processing clusters.

In Example 18, the subject matter of any of Examples 15-17 includes, wherein the predetermined transformation operation comprises event-driven convolution in which, for each value in the second set of values, the value is only processed by the event-based neural processor if the value satisfies a predetermined threshold.

Example 19 is an extended reality (XR) device comprising the processing system of any of Examples 15-18.

In Example 20, the subject matter of Example 19 includes, an optical device communicatively coupled to the processing system, the XR device being configured to perform operations comprising: capturing an image frame using the optical device; accessing, by the processing system, the image frame; and processing, by the processing system, the image frame to obtain the input feature map, each value in the first set of values being an activation value associated with one or more features of the image frame.

Example 21 is at least one machine-readable medium including instructions that, when executed by processing circuitry, cause the processing circuitry to perform operations to implement any of Examples 1-20.

Example 22 is an apparatus comprising means to implement any of Examples 1-20.

Example 23 is a system to implement any of Examples 1-20.

Example 24 is a method to implement any of Examples 1-20.

CONCLUSION

Although specific examples are described herein, it will be evident that various modifications and changes may be made to these examples without departing from the broader spirit or scope of the disclosure. Accordingly, the specification and drawings are to be regarded in an illustrative rather than a restrictive sense. The accompanying drawings that form a part hereof show by way of illustration, and not of limitation, specific examples in which the subject matter may be practiced. The examples illustrated are described in sufficient detail to enable those skilled in the art to practice the teachings disclosed herein. Other examples may be utilized and derived therefrom, such that structural and logical substitutions and changes may be made without departing from the scope of this disclosure. This detailed description, therefore, is not to be taken in a limiting sense, and the scope of various examples is defined only by the appended claims, along with the full range of equivalents to which such claims are entitled.

Such examples of the inventive subject matter may be referred to herein, individually or collectively, by the term "example" or merely for convenience and without intending to voluntarily limit the scope of this application to any single example or concept if more than one is in fact disclosed. Thus, although specific examples have been illustrated and described herein, it should be appreciated another arrangement calculated to achieve the same purpose may be substituted for the specific examples shown. This disclosure is intended to cover any and all adaptations or variations of various examples. Combinations of the above examples, and other examples not specifically described herein, will be apparent to those of skill in the art upon reviewing the above description.

As used in this disclosure, the term "machine learning model" (or simply "model") may refer to a single, stand-alone model, or a combination of models. The term may also refer to a system, component or module that includes a machine learning model together with one or more supporting or supplementary components that do not necessarily perform machine learning tasks.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" and "an" are herein used, as is common in patent documents, to include one or more than one instance.

As used in this disclosure, phrases of the form "at least one of an A, a B, or a C," "at least one of A, B, or C," "at least one of A, B, and C," and the like, should be interpreted to select at least one from the group that comprises "A, B, and C." Unless explicitly stated otherwise in connection with a particular instance in this disclosure, this manner of phrasing does not mean "at least one of A, at least one of B, and at least one of C." As used in this disclosure, the example "at least one of an A, a B, or a C," would cover any of the following selections: {A}, {B}, {C}, {A, B}, {A, C}, {B, C}, and {A, B, C}.

Unless the context clearly requires otherwise, throughout the description and the claims, the words "comprise," "comprising," and the like are to be construed in an inclusive sense, as opposed to an exclusive or exhaustive sense, e.g., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number, respectively.

The word "or" in reference to a list of two or more items, covers all of the following interpretations of the word: any one of the items in the list, all of the items in the list, and any combination of the items in the list. Likewise, the term "and/or" in reference to a list of two or more items, covers all of the following interpretations of the word: any one of the items in the list, all of the items in the list, and any combination of the items in the list.

The various features, steps, operations, and processes described herein may be used independently of one another, or may be combined in various ways. All possible combinations and subcombinations are intended to fall within the scope of this disclosure. In addition, certain method or process blocks or operations may be omitted in some implementations.

Although some examples (e.g., those depicted in the drawings) include a particular sequence of operations, the sequence may be altered without departing from the scope of the present disclosure. For example, some of the operations depicted may be performed in parallel or in a different sequence that does not materially affect the functions as described in the examples. In other examples, different components of an example device or system that implements an example method may perform functions at substantially the same time or in a specific sequence.

GLOSSARY

"Carrier signal" refers, for example, to any intangible medium that is capable of storing, encoding, or carrying instructions for execution by the machine and includes digital or analog communications signals or other intangible media to facilitate communication of such instructions. Instructions may be transmitted or received over a network using a transmission medium via a network interface device.

"Client device" refers, for example, to any machine that interfaces to a communications network to obtain resources from one or more server systems or other client devices. A client device may be, but is not limited to, a mobile phone, desktop computer, laptop, portable digital assistant (PDA), smartphone, tablet, ultrabook, netbook, laptop, multi-processor system, microprocessor-based or programmable consumer electronics, game console, set-top box, or any other communication device that a user may use to access a network.

"Communication network" refers, for example, to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers, for example, to a device, physical entity, or logic having boundaries defined by function or subroutine calls, branch points, Application Programming Interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor, a group of processors or part of a processor) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processors. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors (or part thereof) being an example of hardware. For example, at least some of the operations of a method may be performed by one or more processors or processor-implemented components. At least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers, for example, to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Machine storage medium" refers, for example, to a single or multiple storage devices and media (e.g., a centralized or distributed database, and associated caches and servers) that store executable instructions, routines, and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium."

"Non-transitory computer-readable storage medium" refers, for example, to a tangible medium that is capable of storing, encoding, or carrying the instructions for execution by a machine.

"Processor" may refer to any one or more circuits or virtual circuits (e.g., a physical circuit emulated by logic executing on an actual processor) that manipulates data values according to control signals (e.g., commands, opcodes, machine code, control words, macroinstructions, etc.) and which produces corresponding output signals that are applied to operate a machine. A processor may, for example, include at least one of a CPU, a Reduced Instruction Set Computing (RISC) Processor, a Complex Instruction Set Computing (CISC) Processor, a GPU, a Digital Signal Processor (DSP), a Tensor Processing Unit (TPU), a Neural Processing Unit (NPU), a Vision Processing Unit (VPU), a Machine Learning Accelerator, an Artificial Intelligence Accelerator, an Application Specific Integrated Circuit (ASIC), a Field Programmable Gate Array (FPGA), a Radio-Frequency Integrated Circuit (RFIC), a Neuromorphic Processor, a Quantum Processor, or any combination thereof. A processor may be a multi-core processor having two or more independent processors (sometimes referred to as "cores") that may execute instructions contemporaneously. Multi-core processors may contain multiple computational cores on a single integrated circuit die, each of which can independently execute program instructions in parallel. Parallel processing on multi-core processors may be implemented via architectures like superscalar, VLIW, vector processing, or SIMD that allow each core to run separate instruction streams concurrently. A processor may be emulated in software, running on a physical processor, as a virtual processor or virtual circuit. The virtual processor may behave like an independent processor but is implemented in software rather than hardware. Accordingly, unless a specific processor architecture, hardware, design, and/or structure is specified or is clear from the context, the term "processor," "processing system," or the like, should be interpreted broadly herein.

"Signal medium" refers, for example, to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a manner as to encode information in the signal. The terms "transmission medium" and "signal medium" mean the same thing and may be used interchangeably in this disclosure.

"User device" refers, for example, to a device accessed, controlled, or owned by a user and with which the user interacts to perform an action, or interaction on the user device, including an interaction with other users or computer systems. A user device may, for example, be one or more of the client devices listed above.

What is claimed is:

1. A method for processing a neural network, the method comprising, for each input feature map of a plurality of input feature maps in the neural network:
   accessing, by one or more processors, the input feature map, the input feature map comprising a first set of values;
   generating, by the one or more processors, a differential feature map comprising a second set of values, at least a subset of the second set of values being obtained based on differences between corresponding values of the first set of values in respective spatially adjacent segments of the input feature map;
   performing, by the one or more processors, a predetermined transformation operation with respect to at least a subset of the second set of values to generate a transformed differential feature map comprising a third set of values; and
   generating, by the one or more processors, an output feature map comprising a fourth set of values, at least a subset of the fourth set of values being obtained by accumulating respective values of the third set of values with corresponding values of the fourth set of values that were previously generated in the output feature map, the respective values of the third set of values and the corresponding values of the fourth set of values being in respective spatially adjacent segments of the transformed differential feature map and the output feature map.

2. The method of claim 1, wherein the neural network comprises a convolutional neural network, and the predetermined transformation operation comprises convolving the transformed differential feature map with a kernel.

3. The method of claim 1, wherein the predetermined transformation operation comprises event-driven convolution in which, for each value of the second set of values, the value is only processed if the value satisfies a predetermined threshold.

4. The method of claim 1, wherein each value in the first set of values represents an activation of a neuron of a preceding layer of the neural network.

5. The method of claim 4, wherein the fourth set of values represents output of a current layer of the neural network, the method further comprising:
   propagating, by the one or more processors, at least a subset of the fourth set of values to a subsequent layer of the neural network.

6. The method of claim 1, further comprising:
   performing, by the one or more processors, a thresholding operation by detecting that one or more values of the second set of values is at or below an approximation threshold and, in response to detecting that the one or more values of the second set of values is at or below the approximation threshold, setting the one or more values of the second set of values to zero in the differential feature map.

7. The method of claim 1, wherein the respective spatially adjacent segments of the input feature map comprise respective spatially adjacent lines or respective spatially adjacent channels.

8. The method of claim 1, wherein the respective spatially adjacent segments of the transformed differential feature map and the output feature map comprise respective lines in the output feature map that are spatially adjacent to respective lines in the transformed differential feature map, or respective channels in the output feature map that are spatially adjacent to respective channels in the transformed differential feature map.

9. The method of claim 1, wherein the generation of the differential feature map is at least partially executed in a segment-by-segment manner such that each of one or more segments of the differential feature map is generated using element-wise differences between the respective spatially adjacent segments of the input feature map.

10. The method of claim 1, wherein the generation of the output feature map is at least partially executed in a segment-by-segment manner such that each of one or more segments of the output feature map is generated using element-wise accumulation between the respective spatially adjacent segments of the transformed differential feature map and the output feature map.

11. The method of claim 1, wherein the generation of the differential feature map comprises assigning values of the second set of values for a first segment of the differential feature map by using corresponding values from the first set of values directly, and obtaining values for a plurality of other segments of the differential feature map based on the differences between corresponding values of the first set of values in respective spatially adjacent segments of the input feature map.

12. The method of claim 1, wherein the generation of the output feature map comprises assigning values of the fourth set of values for a first segment of the output feature map by using corresponding values from the third set of values directly, and obtaining values for each of a plurality of other segments of the output feature map by accumulating the respective values of the third set of values with corresponding values of the fourth set of values that were previously generated in the output feature map.

13. The method of claim 1, further comprising:
accessing, by the one or more processors, an image frame; and
processing, by the one or more processors, the image frame to obtain the input feature map, each value in the first set of values being an activation value associated with one or more features of the image frame.

14. The method of claim 13, further comprising:
capturing the image frame using an optical device.

15. A processing system comprising one or more processors configured to process a neural network by performing operations comprising, for each input feature map of a plurality of input feature maps in the neural network:

accessing the input feature map, the input feature map comprising a first set of values;
generating a differential feature map comprising a second set of values, at least a subset of the second set of values being obtained based on differences between corresponding values of the first set of values in respective spatially adjacent segments of the input feature map;
performing a predetermined transformation operation with respect to at least a subset of the second set of values to generate a transformed differential feature map comprising a third set of values; and
generating an output feature map comprising a fourth set of values, at least a subset of the fourth set of values being obtained by accumulating respective values of the third set of values with corresponding values of the fourth set of values that were previously generated in the output feature map, the respective values of the third set of values and the corresponding values of the fourth set of values being in respective spatially adjacent segments of the transformed differential feature map and the output feature map.

16. The processing system of claim 15, wherein the neural network comprises a convolutional neural network, and the predetermined transformation operation comprises convolving the transformed differential feature map with a kernel.

17. The processing system of claim 15, wherein the one or more processors comprises an event-based neural processor comprising one or more processing clusters.

18. The processing system of claim 17, wherein the predetermined transformation operation comprises event-driven convolution in which, for each value in the second set of values, the value is only processed by the event-based neural processor if the value satisfies a predetermined threshold.

19. An extended reality (XR) device comprising the processing system of claim 15.

20. The XR device of claim 19, further comprising an optical device communicatively coupled to the processing system, the XR device being configured to perform operations comprising:
capturing an image frame using the optical device;
accessing, by the processing system, the image frame; and
processing, by the processing system, the image frame to obtain the input feature map, each value in the first set of values being an activation value associated with one or more features of the image frame.

* * * * *